United States Patent
Keerthi

(10) Patent No.: US 9,572,165 B2
(45) Date of Patent: Feb. 14, 2017

(54) PREDICTIVE SPECTRAL ALLOCATION IN MOBILE NETWORKS

(71) Applicant: EMPIRE TECHNOLOGY DEVELOPMENT LLC, Wilmington (DE)

(72) Inventor: Arvind Vijay Keerthi, Karnataka (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/833,082

(22) Filed: Aug. 22, 2015

(65) Prior Publication Data

US 2015/0365932 A1    Dec. 17, 2015

Related U.S. Application Data

(62) Division of application No. 14/123,199, filed as application No. PCT/US2013/047380 on Jun. 24, 2013, now Pat. No. 9,204,448.

(30) Foreign Application Priority Data

Mar. 26, 2013   (IN) .............................. 1349CHE2013

(51) Int. Cl.
*H04W 72/04*   (2009.01)
*H04L 5/00*   (2006.01)
*H04B 17/373*   (2015.01)

(52) U.S. Cl.
CPC ......... *H04W 72/048* (2013.01); *H04B 17/373* (2015.01); *H04L 5/006* (2013.01);
(Continued)

(58) Field of Classification Search
None
See application file for complete search history.

(56) References Cited

U.S. PATENT DOCUMENTS 6,125,278 A    9/2000   Wieczorek et al.
6,977,912 B1   12/2005  Porter et al.
(Continued)

FOREIGN PATENT DOCUMENTS

EP    0766901 B1    10/2004
EP    1344365 B1    2/2013

OTHER PUBLICATIONS

Andrews et al., "Providing Quality of Service over a Shared Wireless Link," IEEECommnunications Magazine, Feb. 2001.
(Continued)

*Primary Examiner* — Min Jung
(74) *Attorney, Agent, or Firm* — Turk IP Law, LLC

(57) ABSTRACT

Technologies are generally described for discerning patterns in the "goodness" or "badness" of time-frequency slots to allow predictive allocation of spectral resources that may be appropriate for a wireless user. According to some examples, information on device location, time slots, sub-carrier(s) allotted for each time slot, and quality indicators may be received from mobile devices. The time slots may be grouped by location to form analysis intervals. A time-frequency vector may then be identified for each analysis interval and a unit of geographic grid. A "goodness" indicator may be computed for each time-frequency vector. Clusters of time-frequency vectors may be categorized for each analysis interval and associated unit of geographic grid such that mobile devices can be assigned "good" clusters through sub-carrier allocation.

21 Claims, 10 Drawing Sheets

(52) U.S. Cl.
CPC ......... *H04L 5/0007* (2013.01); *H04W 72/042* (2013.01); *H04W 72/044* (2013.01); *H04W 72/0446* (2013.01); *H04W 72/0453* (2013.01)

(56) References Cited

U.S. PATENT DOCUMENTS

| | | |
|---|---|---|
| 7,768,973 B2 | 8/2010 | Zhu et al. |
| 8,457,036 B2 | 6/2013 | Goldshtein et al. |
| 8,682,373 B2 | 3/2014 | Leng et al. |
| 8,738,020 B2 | 5/2014 | Li et al. |
| 8,886,238 B2 | 11/2014 | Chun et al. |
| 2002/0119781 A1* | 8/2002 | Li ................... H04L 1/0003 455/450 |
| 2004/0125743 A1 | 7/2004 | Hashem et al. |
| 2006/0068802 A1 | 3/2006 | Benco et al. |
| 2006/0160543 A1 | 7/2006 | Mashinsky |
| 2007/0081507 A1 | 4/2007 | Koo et al. |
| 2007/0298821 A1 | 12/2007 | Bush |
| 2008/0057869 A1 | 3/2008 | Strong et al. |
| 2008/0107074 A1 | 5/2008 | Salmenkaita et al. |
| 2008/0153506 A1 | 6/2008 | Yin et al. |
| 2008/0161033 A1 | 7/2008 | Borran et al. |
| 2009/0296833 A1 | 12/2009 | Sawahashi |
| 2010/0017487 A1 | 1/2010 | Patinkin |
| 2010/0110929 A1 | 5/2010 | Li et al. |
| 2010/0202305 A1 | 8/2010 | Wijting et al. |
| 2010/0302956 A1 | 12/2010 | Haverty |
| 2011/0110251 A1 | 5/2011 | Krishnamurthy et al. |
| 2011/0250916 A1 | 10/2011 | Li et al. |
| 2011/0261781 A1 | 10/2011 | Vrzic et al. |
| 2011/0263206 A1 | 10/2011 | Nagaraja |
| 2012/0008559 A1 | 1/2012 | Leung et al. |
| 2012/0214523 A1 | 8/2012 | Senarath et al. |
| 2013/0005382 A1 | 1/2013 | Landström et al. |
| 2013/0107838 A1 | 5/2013 | Li et al. |
| 2013/0114446 A1 | 5/2013 | Liu et al. |
| 2013/0303114 A1 | 11/2013 | Ahmad et al. |
| 2014/0099914 A1 | 4/2014 | Ngai |

OTHER PUBLICATIONS

Combes et al., "Scheduling Gain for Frequency Selective Rayleigh Fading Channels withApplication to Self-Organizing Packet Scheduling," Elsevier Performance Evaluation, Aug. 2011, pp. 609-709.

Falconer et. al., "Frequency Domain Equalization for Single-Carrier Broadband WirelessSystems," IEEE Communications Magazine, Apr. 2002.

International Search Report and Written Opinion for PCT/US2013/047380, filed Jun. 24, 2013, mailed on Aug. 30, 2013.

Long et al., "A Real-time Algorithm for Long Range Signal Strength Prediction in Wireless Networks," IEEE Wireless Communications and Networking Conference, 2008, pp. 1120-1125.

Charrada et al., "Complex Support Vector Machine Regression for Robust Channel Estimation in L TE Downlink System," International Journal of Computer Networks & Communications (IJCNC) vol. 4, No. 1, Jan. 2012.

Pages, "A Long Term Evolution Link Level Simulator," European Master of Research on Information and Communication Technologies, Universitat Politecnica de Catalunya, Feb. 2009.

Ruckus Wireless, Inc, "ChannelFly-Predictive Capacity Management for Smarter RF Channel Selection," Retrieved from <<http://www.ruckuswireless.com/technology/channelfly>>on Jul. 6, 2012.

Akram, M.S., "Pilot-based Channel Estimation in OFDM Systems," Master Thesis, pp. 1-80, Nokia Mobile Phones (Jun. 8, 2007).

Beek, J., et al., "On Channel Estimation in OFDM Systems," In Proceedings of IEEE 45th Vehicular Technology Conference, vol. 2, pp. 815-819 (Jul. 25-28, 1995).

Coleri, S., et al., "A Study of Channel Estimation in OFDM Systems," In Proceedings of IEEE 56th Vehicular Technology Conference, vol. 2, pp. 894-898 (2002).

Ghaheri-Nri, S., and Leaves, P., "Traffic Control & Dynamic Spectrum Allocation in DRiVE ", MMC 2000 Workshop, pp. 1-26, (Nov. 29-30, 2000).

International Search Report and Written Opinion for PCT/US2013/053103 filed Jul. 31, 2013, mailed Nov. 12, 2013, pp. 11.

* cited by examiner

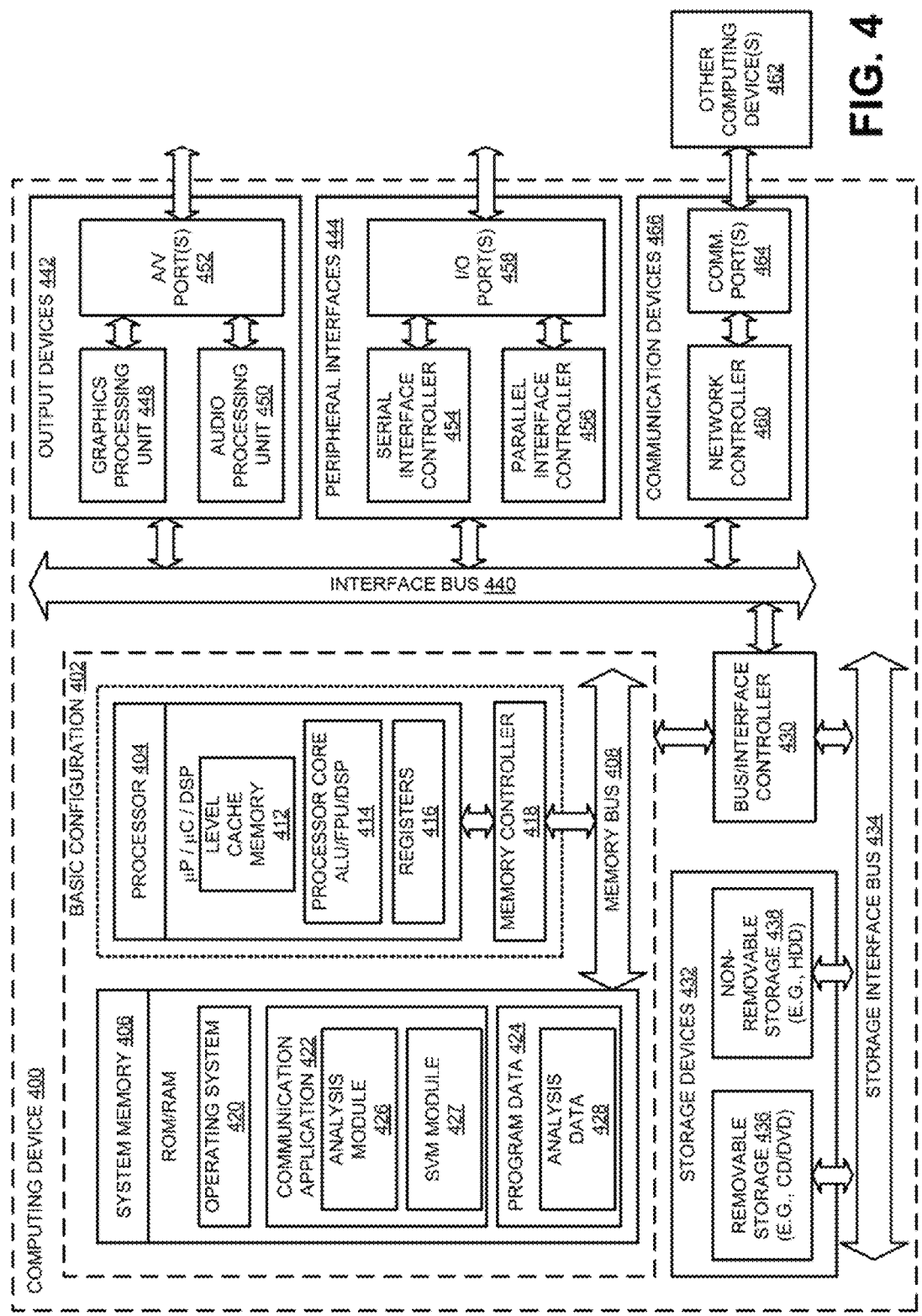

COMPUTER PROGRAM PRODUCT 800

SIGNAL-BEARING MEDIUM 802

804 AT LEAST ONE OF:
ONE OR MORE INSTRUCTIONS FOR DIVIDING A DAY INTO ONE OR MORE ANALYSIS INTERVALS;
ONE OR MORE INSTRUCTIONS FOR DIVIDING A GEOGRAPHIC AREA OF A WIRELESS NETWORK INTO ONE OR MORE SLOTS;
ONE OR MORE INSTRUCTIONS FOR DETERMINING A TIME-FREQUENCY VECTOR FOR EACH ALLOTTED TIME-FREQUENCY SLOT BASED ON AN ALLOTTED TIME-FREQUENCY SLOT FOR A USER AND A SLOT ASSOCIATED WITH THE USER WITHIN EACH ANALYSIS INTERVAL;
ONE OR MORE INSTRUCTIONS FOR COMPUTING A "GOODNESS" INDICATOR VALUE BASED ON COMMUNICATION QUALITY FOR EACH TIME-FREQUENCY VECTOR; AND/OR
ONE OR MORE INSTRUCTIONS FOR ALLOCATING SPECTRUM BASED ON A TIME-FREQUENCY VECTOR SELECTED FROM A "GOOD" CLUSTER.

| COMPUTER-READABLE MEDIUM 806 | RECORDABLE MEDIUM 808 | COMMUNICATIONS MEDIUM 810 |

FIG. 8

PREDICTIVE SPECTRAL ALLOCATION IN MOBILE NETWORKS

CROSS-REFERENCE TO RELATED APPLICATIONS

This Application is a divisional filing under 35 U.S.C §121 of and claims priority under 35 U.S.C §120 to co-pending U.S. patent application Ser. No. 14/123,199 filed on Nov. 29, 2013, which is a U.S. national stage filing under 35 U.S.C §371 of International Application No. PCT/US13147380 filed on Jun. 24, 2013, which claims priority under 35 U.S.C §119 (a) and (b) of India Application No. 1349/CHE/2013 filed on Mar. 26, 2013. The U.S. Patent Application, the International Application, and the India Application are herein incorporated by reference in their entireties.

BACKGROUND

Unless otherwise indicated herein, the materials described in this section are not prior art to the claims in this application and are not admitted to be prior art by inclusion in this section.

Transmission from a base-station to a mobile device may be spread across in time and frequency using a spreading technique, such as orthogonal frequency division multiple access (OFDMA). A spreading technique may be used in many modern mobile standards, such as Long Term Evolution (LTE), assigning time and frequency slots to individual user devices.

A "good" time-frequency region for one wireless user may be unsuitable for another. For example, a user may experience high interference in certain frequency slots at a certain time of day, or perhaps the user's multi-path profile may be such that at the user's current location, some frequency slots may provide better signal-to-noise performance. In this case, communication between the base-station and the wireless user may not use the former frequency slots and may utilize the latter frequency slots.

Optimal regions of time-frequency space for a given user may be able to be determined ahead of time. After all, similar patterns in everyday life may be detected for users. For example, many drivers may know the vehicular traffic pattern in their localities and may know which freeways and/or back-routes to use at which times. Further they may also recognize patterns of when traffic may be slower and at those times avoid certain routes, such as the route passing a stadium during an annual football match.

SUMMARY

The present disclosure generally describes methods, apparatus, systems, devices, and/or computer program products for performing, predictive spectral allocation in mobile networks.

In some examples, various methods for employing predictive spectral allocation in wireless networks may be described. Example methods may include receiving a request for sub-carrier allocation from a mobile device, the request including a timestamp and a location of the mobile device and identifying a good cluster based on the timestamp and the location. The methods may also include selecting a time-frequency vector from the "good" cluster and transmitting sub-carrier allocation information to the mobile device, where the sub-carrier allocation information is based on the time-frequency vector.

In other examples, a controller for a wireless network configured to employ predictive spectral allocation may be described. The controller may include a communication module for communicating with a plurality of mobile devices over a wireless network. The controller may also include a processor coupled to the communication module. The processor may be configured to receive a request for sub-carrier allocation from a mobile device, the request including, a timestamp and a location of the mobile device. The processor may also be configured to identify a good cluster based on the timestamp and the location, select a time-frequency vector from the "good" cluster, and transmit sub-carrier allocation information to the mobile device based on the time-frequency vector.

In further examples, a method for analyzing sub-carrier allocation data to categorize clusters for predictive spectral allocation in wireless networks may be described. The method may include receiving information on device location, time slots, sub-carrier(s) allotted for each time slot, and quality indicators from a plurality of mobile devices; grouping the time slots to form analysis intervals; and identifying a time-frequency vector for each analysis interval, where the time-frequency vector associates the analysis interval with the device location. The method may also include computing a goodness indicator for each time-frequency vector; identifying clusters of time-frequency vectors; and categorizing the clusters of time-frequency vectors into two or more categories.

In yet other examples, an analysis server for analyzing sub-carrier allocation data to categorize clusters for predictive spectral allocation in wireless networks may be described. The analysis server may include a memory configured to store instructions and a processor coupled to the memory. The processor may be configured to receive information on device location, time slots, sub-carrier(s) allotted for each time slot, and quality indicators from a plurality of mobile devices; group the time slots by location to form analysis intervals; and identify a time-frequency vector for each analysis interval, where the time-frequency vector associates the analysis interval with the device location. The processor may also be configured to compute a goodness indicator for each time-frequency vector; identify clusters of time-frequency vectors; and categorize clusters of time-frequency vectors into two or more categories.

In yet further examples, a computer-readable storage medium may be described with instructions stored thereon for employing predictive spectral allocation in wireless networks, analyzing sub-carrier allocation data to categorize clusters for predictive spectral allocation in wireless networks, and the instructions causing one or more methods to be performed when executed. The methods may be similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates a general purpose computing device, which may be used to implement predictive spectral allocation in wireless networks using support vector machines;

FIG. 8 illustrates a block diagram of an example computer program product for implementing predictive spectral allocation in wireless networks using support vector machines;

Figure 1:
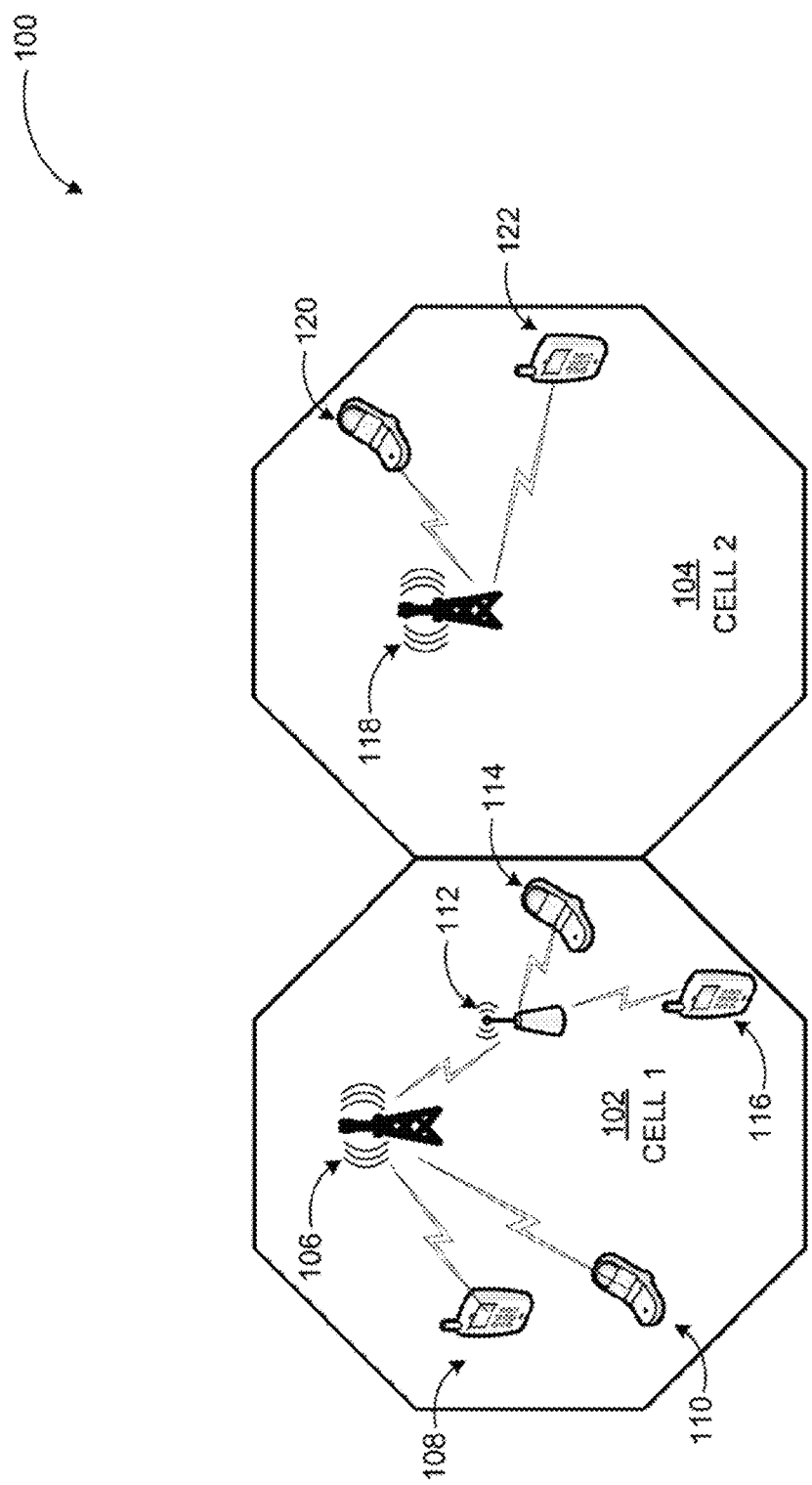
FIG. 1 illustrates two cells of an example cellular communication system, where predictive spectral allocation using support vector machines may be employed.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein, it will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to performing predictive spectral allocation in mobile networks.

Briefly stated, patterns in the "goodness" or "badness" of time-frequency slots may be discerned to allow predictive allocation of spectral resources that may be appropriate for a wireless user. According to some examples, information on device location, time slots, sub-carrier(s) allotted for each time slot, and quality indicators may be received from mobile devices. The time slots may be grouped by location to form analysis intervals. A time-frequency vector may then be identified for each analysis interval and a unit of geographic grid. A "goodness" indicator may be computed for each time-frequency vector. Clusters of time-frequency vectors may be categorized for each analysis interval and associated unit of geographic grid such that mobile devices can be assigned "good" clusters through sub-carrier allocation.

FIG. 1 illustrates two cells of an example cellular communication system, where predictive spectral allocation using support vector machines may be employed, arranged in accordance with at least some embodiments described herein.

Some wireless communication networks, specifically cellular communication systems employ "cells" as the network infrastructure. Each cell is typically served by a base station that enables end user devices (EUs), in this case mobile devices, to communicate wirelessly with other EUs within the same cell, in other cells, and in other systems. As shown in a diagram 100, a geographic area of a wireless network may be divided into two neighboring cells, cell 1 102 and cell 2 104. Cell 1 102 may be served by a base station (BTS) 106 and may include end user devices 108, 110, 114, and 116. Cell 2 104, may be served by a base station 118 and may include end user devices 120 and 122.

In some scenarios, a relay device 112 may be employed, to facilitate communication between one or more EUs (e.g., EUs 114 and 116) and their base station (e.g., BTS 106). For example, when the wireless signal is weak in a particular location due to interference, geographic structure, manmade obstructions, etc., a relay device may assist in establishing a reliable link between the base station and the EUs.

A wireless network may be one of an Evolved Universal Mobile Teleconununications System Terrestrial Radio Access Network (eUTRAN), a long term evolution (LTE) network, an LTE-Advanced network, as high speed packet access (HSPA) network, or an HSPA-Advanced network. A mobile device may include one of a cellular phone, a smart phone, a computing device equipped with cellular communication capability, or a specialized device equipped with cellular communication capability. Furthermore, a wireless communication technology between a base station and a mobile device may utilize one of frequency division multiple access (FDMA), orthogonal frequency division multiple access (OFDMA), or a narrow band allocation technology. The wireless communication between a base station and a mobile device may be subject to degradation arising out of interference from other users, frequency selectivity of the radio channel, and fading of the radio channel. It may be desirable to use time-frequency slots that provide highest quality for communication. For example, those time-frequency slots that may be least corrupted by interference or fading, and enjoying, a frequency-selectivity peak. Interference may arise out of the activity of neighboring base-stations and users. However, the activity alone may not be used to indicate that interference may be high at a certain sub-carrier and low at another for a particular mobile's location. Likewise, the frequency selectivity may be dependent on the multipath profile and hence the local geography, but the dependence may not indicate which sub-carrier may have a high SNR, because the multipath profile faced by a particular mobile device may not be known. Fading may be an even more complex phenomenon depending on the speed of change of multipath.

Therefore, a physical model predicting any of the above parameters may be difficult to construct. A statistical model may be able to predict parameters. A pattern to interference may exist. For example, mobile usage may be high in downtown during rush hour. Downtown base-stations may be "stomping" on the residential condominiums across the river during rush hour. However, there may be a "good" spot in the condominiums park, which may be somehow shielded from interference, but maybe only in certain frequency slots. Overall, there may be a time- and position-dependent pattern to the variation in channel conditions.

By exploiting long-term patterns in channel conditions, call quality may improve as the chance of assigning a user to frequency-slots that are suited for the user increases. There may be less frequent re-allocation of frequency-slots, as the ones allotted at the beginning of an analysis interval may be historically successful ones. Less frequent re-allocation may reduce the downlink control bits that may be used to move users around and may reduce an expensive overhead on downlink bandwidth.

Figure 2A:
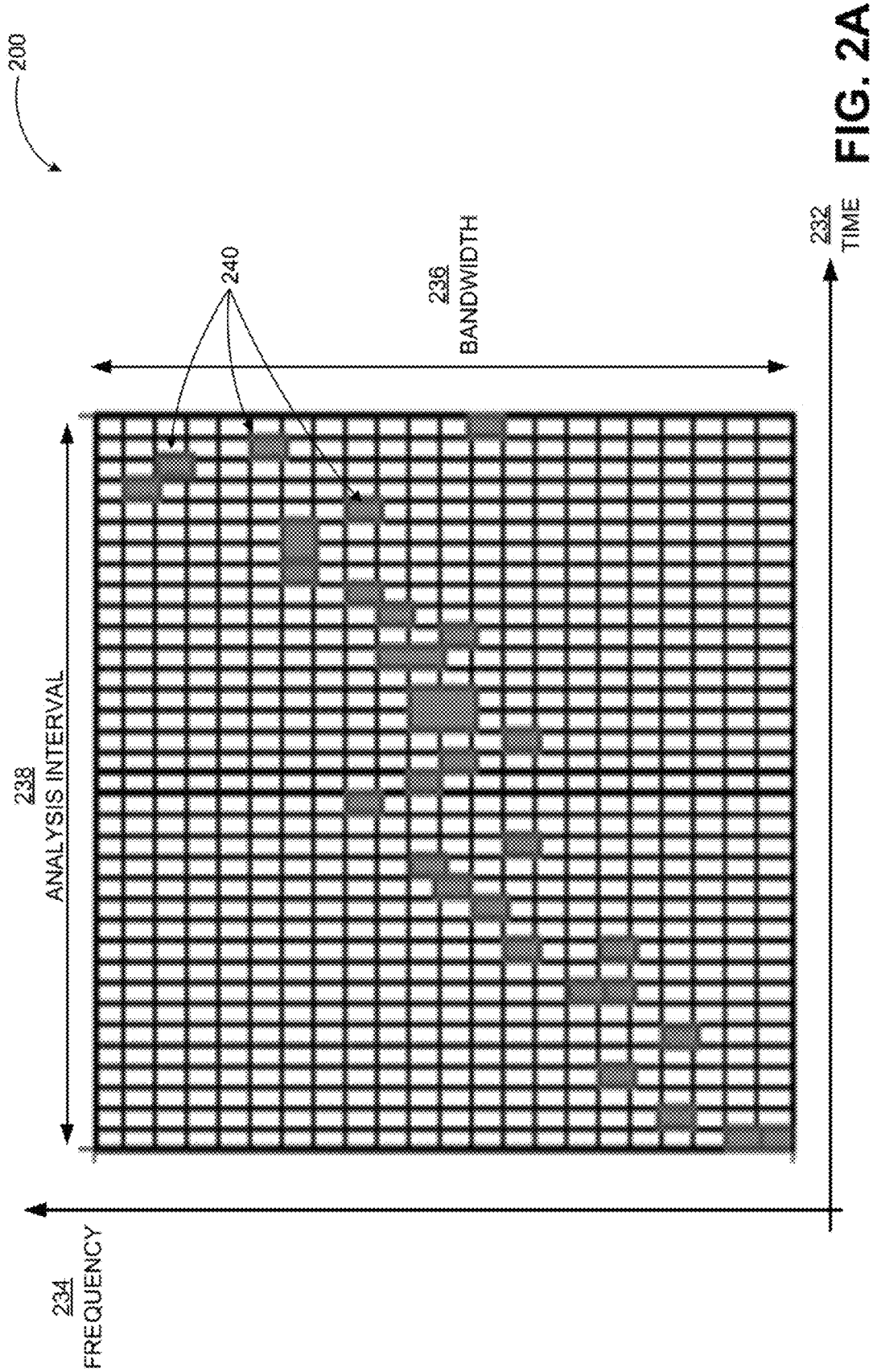
FIG. 2A illustrates an example spectral allocation where shaded slots represent spectral allotments for particular users.

FIG. 2A illustrates an example spectral allocation where shaded slots represent spectral allotments for particular users, arranged in accordance with at least some embodiments described herein.

As shown in a diagram 200, time 232 may be plotted against frequency 234 within a mobile network to define a time-frequency slot. A 24-hour day may be divided into five-second analysis intervals 238 to represent time and an available bandwidth 236 of the network may be divided into available frequencies or channels forming grid cells representing available time-frequency slots that can be allocated to mobile devices. Shaded slots 240 may represent spectral allotments for a given user, each associated with a "goodness" indicator value for that particular time-frequency slot.

For example, a single-carrier LTE deployment may have a time unit of one millisecond and roughly 1000 possible frequency slots. Therefore, one five-second analysis interval may include about five million time-frequency slots. A user may receive a small fraction, approximately less than 1%, of these five million slots and the region occupied by the time-frequency slots allocated to the user is shown using shaded slots 240. The length of the analysis interval may be adjusted depending on a time of day, a day of week, a day of month, a season, location of mobile device, and/or an expected population change within a geographic area.

The shaded slots 240 may have a measure of "goodness" associated with them. For example, a mobile device may auto-report a channel-quality indicator (CQI) every several time-slots and an average of the CQIs may be taken over a five-second interval to serve as a goodness-indicator. If the call fails within the five-second interval then the goodness-indicator may be low. The mobile device may also report one or more of other quality indicators, such as a received signal strength indicator (RSSI), a bit error rate (BER) a number of packet retransmissions, a signal to noise ratio (S/N), a number of call failures, a user feedback, a user requested power-down at the same bit-rate, and/or a user requested power-up. One or more of these quality indicators may be used for computing "goodness" of a time-frequency slot.

Figure 2B:
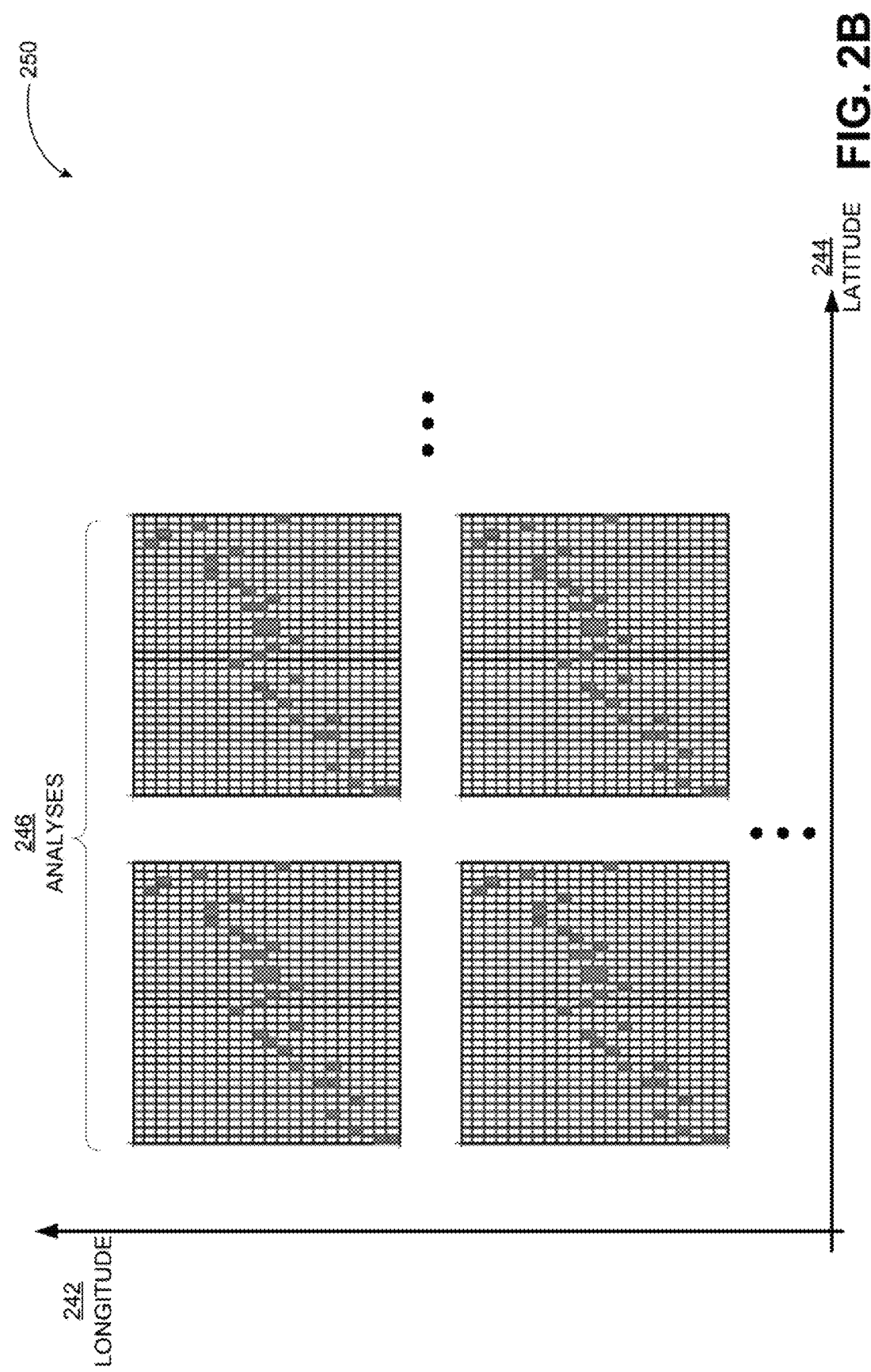
FIG. 2B illustrates example spectral allocation analyses performed for various locations of mobile users.

FIG. 2B illustrates example spectral allocation analyses performed for various locations of mobile users, arranged in accordance with at least some embodiments described herein.

As shown in diagram 250, the time-frequency slot based allocation (analyses 246) may be repeated for various locations of mobile devices or units of geographic grid. In some example embodiments, the units of geographic grid may be based on longitude 242 and latitude 244. Other coordinate systems may also be employed in other examples. Thus, each analysis interval may correspond to a particular unit of geographic grid in the network and the units of geographic grid may also be defined with different granularities for different analysis intervals (e.g. a fraction of a downtown city block during the day vs. the whole block at night).

Figure 3A:
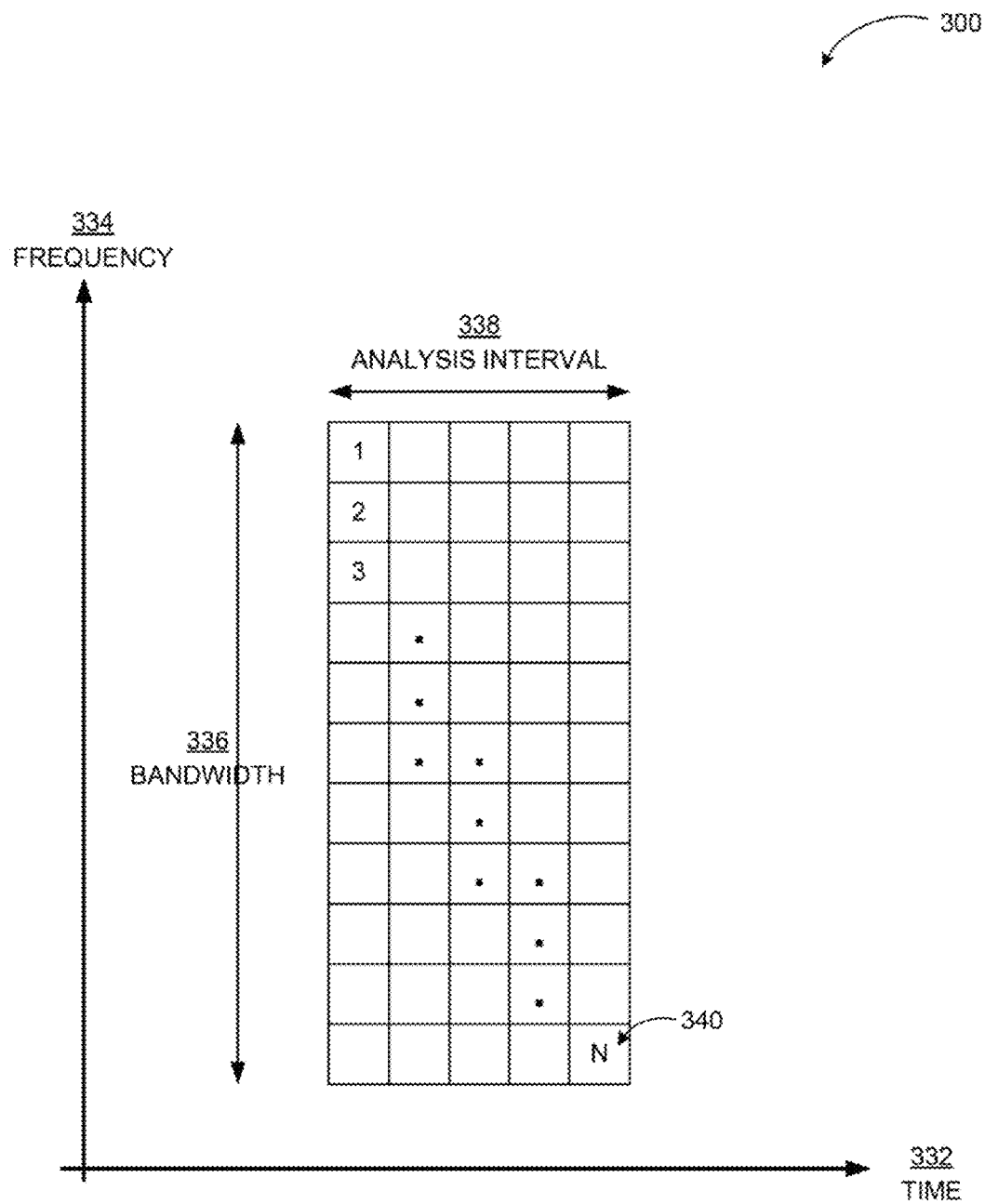
FIG. 3A illustrates the labeling convention for spectral allotments.

FIG. 3A illustrates the labeling convention for spectral allotments, arranged in accordance with at least some embodiments described herein.

As shown in a diagram 300, a time-frequency slot within a mobile network may be defined by plotting time 332 against frequency 334. A predefined time period (e.g., a day, a week, a month, etc.) may be divided into unit analysis intervals 338 (e.g., seconds, minutes, days, etc.) to represent time. Similarly, available frequencies (or channels) within a network bandwidth 336 may be used to form cells of a grid defining time-frequency slots. Spectral allotments may be determined for a given user and associated with a "goodness" indicator value for each particular time-frequency slot. For labeling spectral allotments purposes, the top-left time-frequency slot is Slot 1 and the bottom-right is Slot N 340, where N is the total number of time-frequency slots in the analysis interval.

Wireless transmission conditions may be stable for a few seconds, therefore the 24-hour day may be divided into five-second analysis intervals and each interval may have millions of time-frequency slots, for example. A mobile network's geographical area may also be divided into a geographic grid. The geographic grid may be of any shape and include multiple units. According to one example, a unit of the geographic grid may be 5 meters by 5 meters. Sizes of the divided geographical area may be adjusted depending on whether the area is densely or sparsely populated, depending on a communication technology of the wireless network, and/or depending on a selected frequency of communication. The size may be further adjusted based on a time of day, a day of week, a day of month, a season, and/or an expected population change within a geographic area. The base station may record the time of day and the mobile device's location (e.g., latitude and longitude). The base station may further allocate a time-frequency slot to the mobile device using a presently available scheduler. Shaded slots, as shown in FIG. 2, may represent the allocated time-frequency slots may be labeled as shown in FIG. 3A.

Figure 3B:
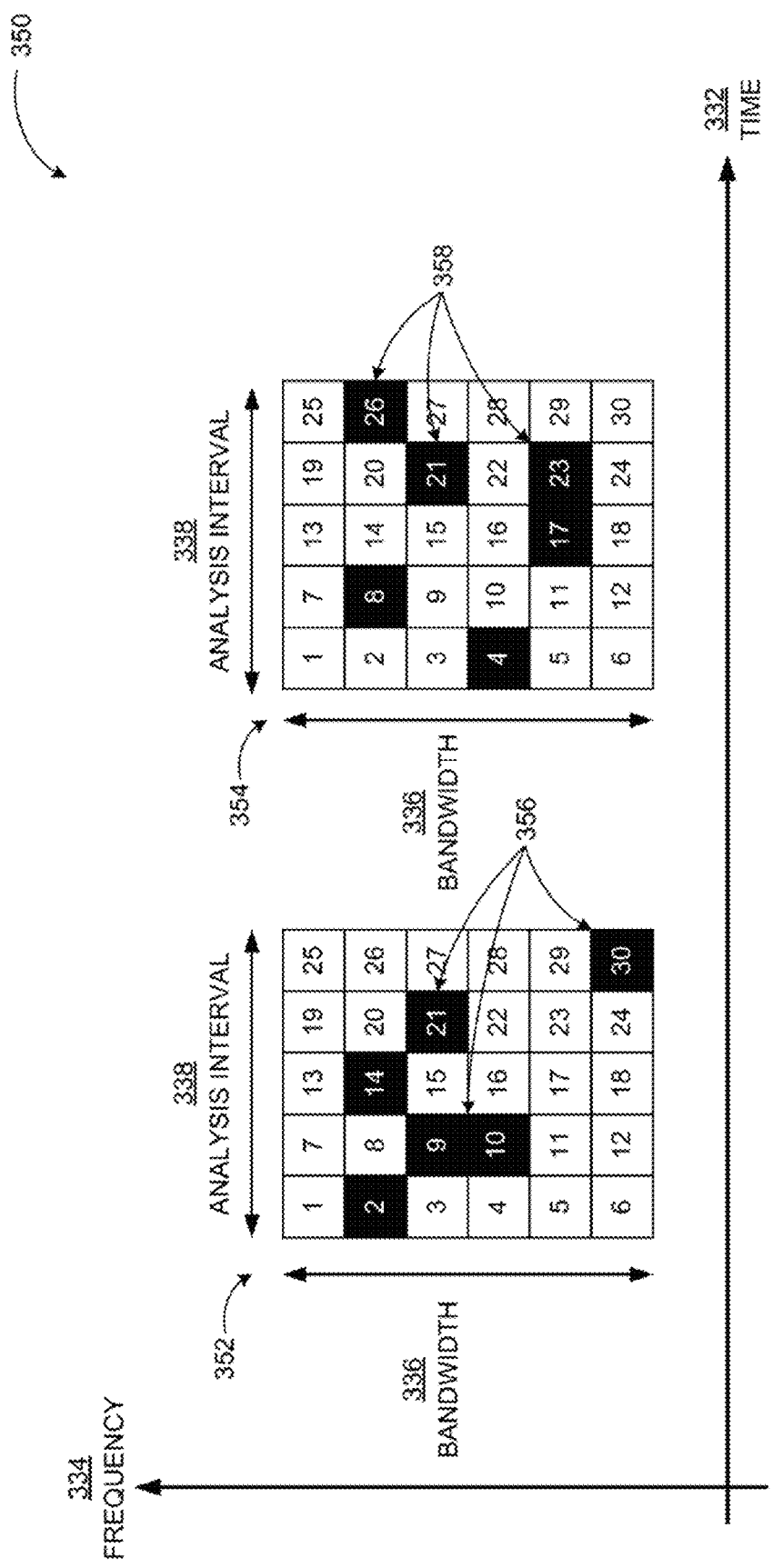
FIG. 3B illustrates an example transformation of a time-frequency slot to a vector.

FIG. 3B illustrates an example transformation of a time-frequency slot to a vector, arranged in accordance with at least some embodiments described herein.

As shown in a diagram 350, a time-frequency slot within a cellular network may be defined by plotting time 332 against frequency 334. In an example scenario, a 24-hour day may be divided into five-second analysis intervals 338 to represent time and available frequencies within usable bandwidth 336. Using the labeling convention described in FIG. 3A, the allotted time-frequency slots may be described as a time-frequency vectors associated with locations (predefined geographic areas within the network's coverage area such as unit areas of 5 m by 5 m or other sizes). The time-frequency vectors in return may be grouped as clusters 352 and 354. In cluster 352, the allotted time-frequency slots 356 may be represented by the shaded slots [2,9,10,14,21, 30], and in cluster 354, the allotted time-frequency slots 358 may be represented by the shaded slots [4,8,17,21,23,26] The shaded slots [2-9-10-14-21-30] may be allocated at the beginning of the analysis interval. Following allocation, traffic data may fill these slots as time unfolds.

Once a time-frequency vector is included in a cluster, a determination may be made whether the time-frequency allocation is satisfactory or not in terms of user-experience through mobile device/user feedback. For example, one or more of the following events may have taken place: a mobile device may have requested a power-down at a same bit-rate; a mobile device's CQI sequence may average to a high number; and/or a call may have ended smoothly and a user may have indicated that he/she was happy. In this scenario, the allotted time-frequency slot for that user's location (the time-frequency vector) may be labeled as "good." In another example, one or more of the following events may have taken place: a mobile device may have requested for increased, transmit power; a mobile device's CQI sequence may average poorly; and/or user feedback may indicate dissatisfaction. In this scenario, the allotted time-frequency slot for that user's location (the time-frequency vector) may be labeled as "bad," An indication from the mobile device that the sub-carrier allocation is unacceptable may be received by the mobile device's network, which may switch to a default sub-carrier allocation to improve quality. The network may then forward a "bad" quality indication associated with the unacceptable sub-carrier allocation to an analysis server.

Millions of wireless connections may be made and completed over time allowing a cluster of "good" vectors and "bad" vectors to form for each analysis interval and each location. A suitable machine learning algorithm like support vector machine (SVM) and neural network may then be used to define the "good" vectors from the "bad" vectors. Sufficient training may be completed so that when allocating spectrum for the next wireless connection, the base station may choose a time-frequency vector deep within a "good" cluster (e.g., a cluster with a majority of good time-frequency vectors) and allocate a time-frequency slot associated with the vector chosen. Such a time-frequency slot may be termed the required spectral allocation.

In some examples, the training may be continuous. A "good" time-frequency vector may be chosen and deployed, but the resulting allocation may continue to be assessed and may be relabeled "good" or "bad". As training develops, the assessment criteria may likely continue to report "good", but there may be statistical chance that the assessment criteria belies the selection of the time-frequency vector. Wireless transmission conditions ma also vary with time. For example, new buildings may be constructed that alter the multi-path profile. Therefore, each transmission, even after training has matured, may serve as a useable data-point.

Various example embodiments are described above using specific values, parameters, and configurations. These examples are for illustration purposes only and are not intended to constitute a limitation on embodiments. Embodiments may be implemented with any reasonable values and suitable parameters and configurations using the principles described herein. For example, the discussed grid measurements for location ranges or time ranges may include any suitable values depending on network, mobile device numbers, geographic area, communication technology, etc.

FIG. 4 illustrates a general purpose computing device, which may be used to implement predictive spectral allocation in wireless networks using support vector machines, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level cache memory 412, a processor core 414, and registers 416. Example processor core 414 may include an arithmetic logic unit (AlX), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more communication applications 422, and program data 424. Communication application 422 may include an analysis module 426 that may receive and analyze indicators associated with the sub-carrier allocations and an SVM module 427 which may define and categorize clusters of time-frequency vectors with "good" and "bad" indicators. Then, the communication application 422 may utilize a multiple access technology such as frequency division multiple access (FDMA), orthogonal frequency division multiple access (OFDMA), Carrier-Sense Multiple Access (CSMA), or a narrow band allocation technology to enable communication between a base station and mobile device regarding quality of sub-carrier allocations. Program data 424 may include one or more of analysis data 428 (e.g. quality of allotted time-frequency slots, etc.) and similar data as discussed above in conjunction with at least FIG. 1 through 3. This data may be useful for predicting spectral allocation as is described herein. This described basic configuration 402 is illustrated in FIG. 4 by those components within the inner dashed line. Computing device 400 may be implemented as a server in a wireless communication network or as part of a base station in such a network.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disc devices such as flexible disc drives and hard-disc drives (HDD), optical disc drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile discs (DVDs) or other optical storage, magnetic cassettes, magnetic tape, magnetic disc storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 466 to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover computing device 400 may be implemented as a networked system or as part of a general purpose or specialized server.

Networks for a networked system including computing device 400 may comprise any topology of servers, clients, switches, routers, modems, Internet service providers, and any appropriate communication media (e.g., wired or wireless communications 1. A system according to embodiments may have a static or dynamic network topology. The networks may include a secure network such as an enterprise network (e.g., a LAN. WAN, or WLAN), an unsecure network such as a wireless open network (e.g., IEEE 802.11 wireless networks), or a world-wide network such as (e.g., the Internet). The networks may also comprise a plurality of distinct network's that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
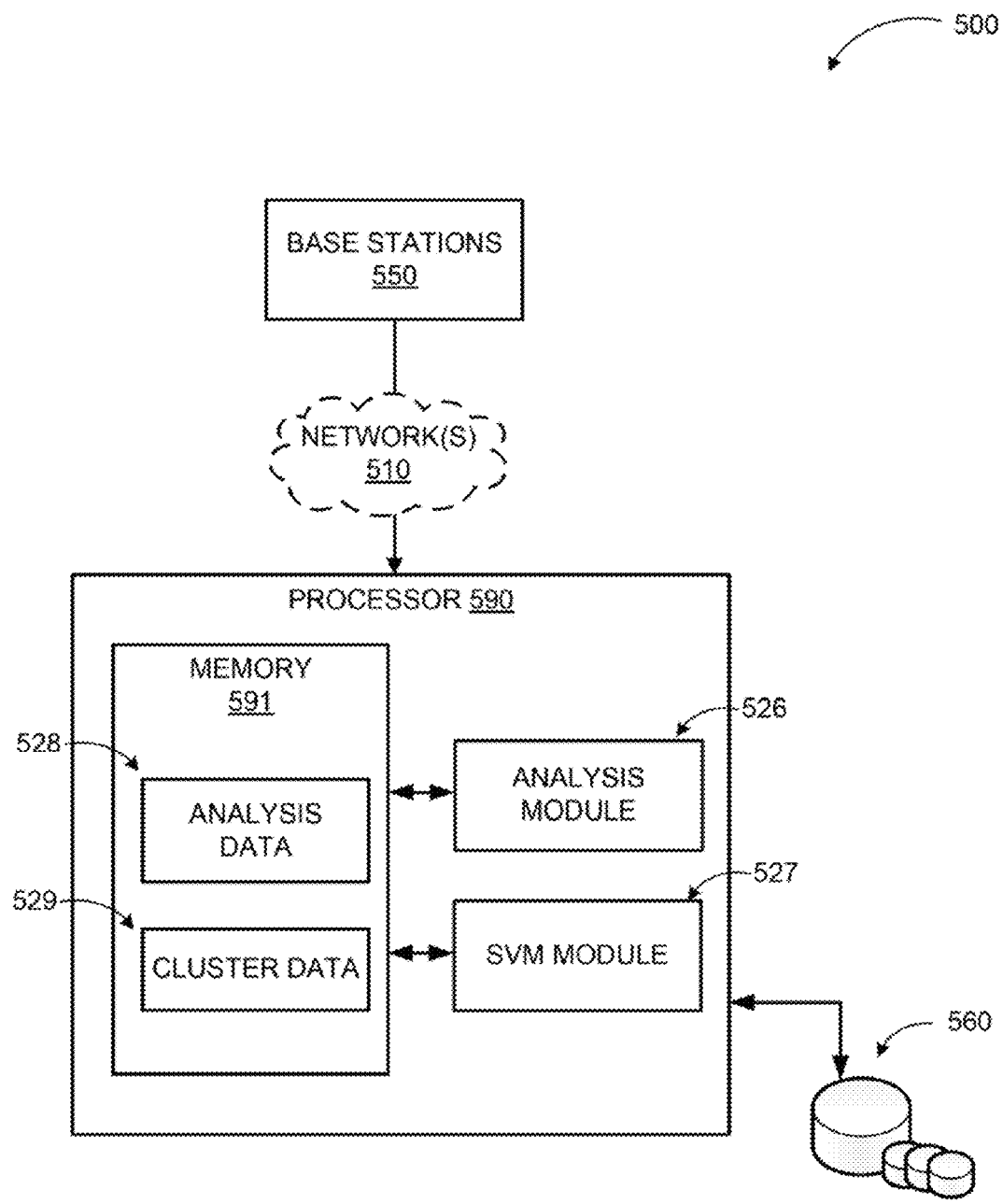
FIG. 5 illustrates a special purpose processor, which may be used to implement predictive spectral allocation in wireless networks using support vector machines.

FIG. 5 illustrates a special purpose processor, which may be used to implement predictive spectral allocation in wireless networks using support vector machines, arranged ill accordance with at least some embodiments described herein.

As shown in diagram 500, processor 590 may be part of a control system of base stations 550 through network(s) 510 for predicting spectral allocation in mobile networks. Processor 590 may also communicate with data source 560 storing network related information.

Processor 590 may include a number of processing modules such as an analysis module 526 and an SVM module 527. Analysis data 528 and cluster data 529 may be used by processor 590 in conjunction with the analysis module 526 and the SVM module 527 to define and categorize "good" and "bad" clusters in mobile network's. Analysis data 528 and cluster data 529 may be stored during processing in memory 591, which may be a cache memory of the processor 590 or an external memory (e.g., memory external to processor 590).

Example embodiments may also include methods for providing spectral allocation in mobile networks. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
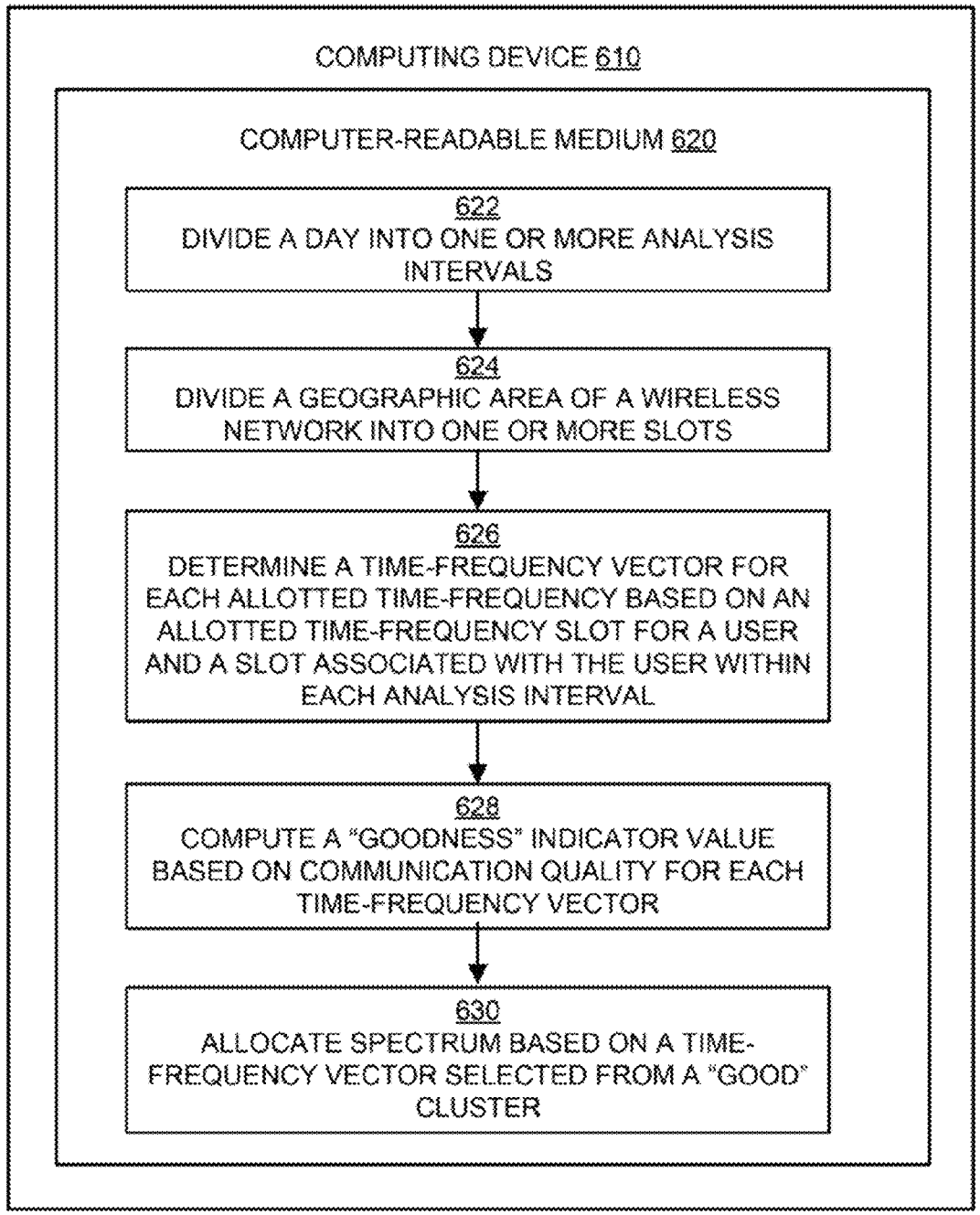
FIG. 6 is a flow diagram of instructions on a computer-readable medium illustrating an example method for analyzing sub-carrier allocation data to categorize clusters for predictive spectral allocation in wireless networks that may be performed by a computing device such as the computing device in FIG. 4 or the special purpose processor of FIG. 5.

FIG. 6 is a flow diagram of instructions on a computer-readable medium 620 illustrating an example method for analyzing sub-carrier allocation data to categorize clusters for predictive spectral allocation in wireless networks that may be performed by a computing device 610 such as the computing device 400 in FIG. 4 or the special purpose processor of FIG. 5, arranged in accordance with at least some embodiments described herein.

An example method for performing predictive spectral allocation in mobile networks may begin with block 622, "DIVIDE A DAY INTO ONE OR MORE ANALYSIS INTERVALS," where a 24-hour day may be divided into one or more five-second analysis intervals 238.

Block 622 may be followed by block 624, "DIVIDE A GEOGRAPHIC AREA OF A WIRELESS NETWORK. INTO ONE OR MORE SLOTS", where the area of a wireless network may be divided into one or more slots as discussed previously.

Block 624 may be followed by block 626, "DETERMINE A TIME-FREQUENCY VECTOR FOR EACH ALLOTTED TIME-FREQUENCY BASED ON AN ALLOTTED TIME-FREQUENCY SLOT FOR A USER AND A SLOT ASSOCIATED WITH THE USER WITHIN EACH ANALYSIS INTERVAL", where each allotted time-frequency slot may be described as a vector 352 using the time 332, represented by analysis intervals 338, frequency 334, measured using a mobile bandwidth 336, and the geographic slot in which the user of the device is located. The shaded allotted time-frequency slots 356 within the allotted me-frequency vector may be associated with a "goodness" indicator value.

Block 626 may be followed by block. 628, "COMPUTE A "GOODNESS" INDICATOR VALUE BASED ON COMMUNICATION QUALITY FOR EACH TIME-FREQUENCY VECTOR", where a "goodness" indicator for each analysis interval and time-frequency vector may be computed and categorized into two or more categories based on clusters of time-frequency vectors for each analysis interval and associated location. The two or more categories may include a binary group of "good" and "bad" clusters. A support vector machine (SVM) algorithm and/or a neural network may be then be employed to define and categorize clusters of time-frequency vectors with "good" and "bad" indicator values.

Block 628 may be followed by block 630, "ALLOCATE SPECTRUM BASED ON A TIME-FREQUENCY VECTOR SELECTED FROM A "GOOD" CLUSTER", where a base station may choose the time-frequency vector from the good cluster of time-frequency vectors to allocate associated time-frequency slot to a mobile device.

Figure 7:
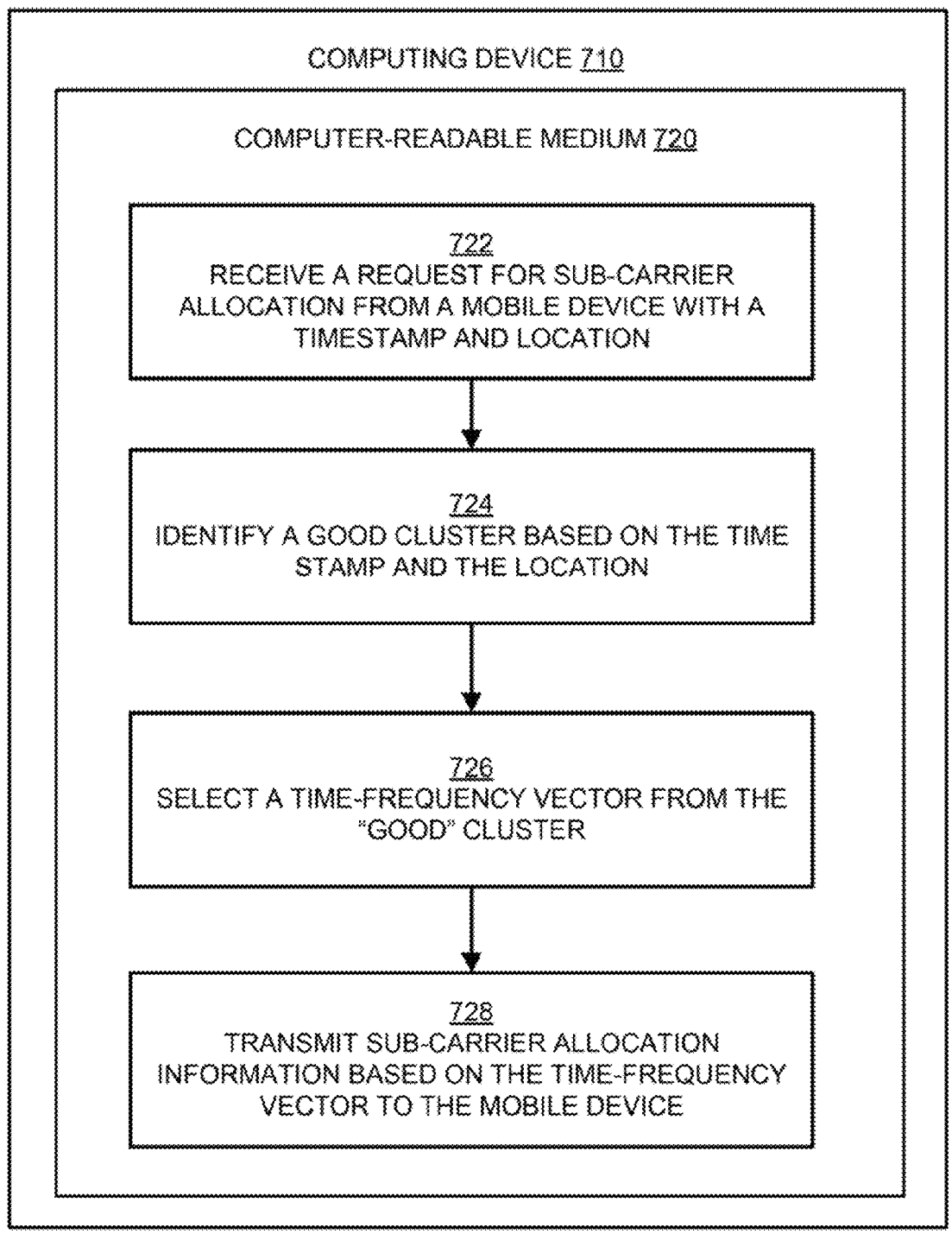
FIG. 7 is a flow diagram of instructions on a computer-readable medium illustrating an example method for employing predictive spectral allocation in wireless networks using support vector machines that may be performed by a computing device such as the computing device in FIG. 4 or the special purpose processor of FIG. 5.

FIG. 7 is a flow diagram of instructions on a computer-readable medium 720 illustrating an example method for employing predictive spectral allocation in wireless networks using, support vector machines that may be performed by a computing device 710 such as the computing device 400 in FIG. 4 or the special purpose processor of FIG. 5, arranged in accordance with at least some embodiments described herein.

An example method for performing predictive spectral allocation in mobile networks may begin with block 722, "RECEIVE A REQUEST FOR SUB-CARRIER ALLOCATION FROM A MOBILE DEVICE WITH A TIMESTAMP AND LOCATION," where a request for sub-carrier allocation from a mobile device 112, the request including, a timestamp and a location of the mobile device 112.

Block 722 may be followed by block 724, "IDENTIFY A GOOD CLUSTER BASED ON THE TIME STAMP AND THE LOCATION", where a good cluster of time-frequency vectors may be identified based on the timestamp and the location of the mobile device 112.

Block 724 may be followed by block 726, "SELECT A TIME-FREQUENCY VECTOR FROM THE. "GOOD" CLUSTER", where the server or controller performing the spectral allocation may select a time-frequency vector from the "good" cluster for the mobile device 112.

Block 726 may be followed by block 728, "TRANSMIT SUB-CARRIER ALLOCATION INFORMATION BASED ON THE TIME-FREQUENCY VECTOR TO THE MOBILE DEVICE", where the server or controller may transmit the sub-carrier allocation information to the mobile device 112 through a base station 118.

The operations included in the processes of FIGS. 6 and 7 described above are for illustration purposes. Analyzing, sub-carrier allocation data to categorize clusters for predictive spectral allocation in wireless networks and employing predictive spectral allocation in wireless networks using support vector machines may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 8 illustrates a block diagram of an example computer program product for implementing predictive spectral allocation in wireless networks using support vector machines, arranged in accordance with at least some embodiments described herein.

In some examples, as shown in FIG. 8, computer program product 800 may include a signal bearing medium 802 that may also include machine readable instructions 804 that, when executed by, for example, a processor, may provide the functionality described above with respect to FIG. 1 through FIG. 3. Thus, for example, referring to processor 590, one or more of the tasks shown in FIG. 8 may be undertaken in response to instructions 804 conveyed to the processor 590 by medium 802 to perform actions associated with performing predictive spectral allocation in mobile networks as described herein. Some of those instructions may include dividing a day into one or more analysis intervals, dividing a geographic area of a wireless network into one or more slots, determining a time-frequency vector for each allotted time-frequency slot based on an allotted time-frequency slot for a user and a slot associated with the user within each analysis interval, computing a "goodness" indicator value based on communication quality for each time-frequency vector, and allocating spectrum based on a time-frequency vector selected from a "good" cluster.

In some implementations, signal bearing medium 802 depicted in FIG. 8 may encompass a computer-readable medium 806, such as, but not limited to, a hard disc drive, a Compact Disc (CD), a Digital Versatile Disc (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide a wired communications link, a wireless communication link, etc.). Thus, for example, computer program product 800 may be conveyed to the processor 590 by an RF signal bearing medium 802, where the signal bearing medium 802 is conveyed by a wireless communications medium 810 (e.g., a wireless communications medium conforming with the IEEE 802.11 standard).

In some examples, various methods for employing predictive spectral allocation in wireless networks may be described. Example methods may include receiving a request for sub-carrier allocation from a mobile device, the request including at timestamp and a location of the mobile device and identifying a good cluster based on the timestamp and the location. The methods may also include selecting a time-frequency vector from the "good" cluster and transmitting sub-carrier allocation information to the mobile device, where the sub-carrier allocation information is based on the time-frequency vector.

In other examples, transmitting the sub-carrier allocation information may include transmitting a sequence of frequencies to be used in consecutive time slots. The method may further include in response to receiving an indication from the mobile device that the sub-carrier allocation is unacceptable, switching to a default sub-carrier allocation, and forwarding a had quality indication associated with the sub-carrier allocation to an analysis server.

In further examples, identifying the good cluster based on the timestamp and the location may include receiving information on device location, time slots, sub-carrier(s) allotted for each time slot, and quality indicators from a plurality of mobile devices; grouping the time slots by device location to form analysis intervals; identifying a time-frequency vector for each analysis interval, where the time-frequency vector associates the analysis interval with the device location; computing a goodness indicator for each time-frequency vector; and identifying one or more clusters of time-frequency vectors for each analysis interval and associated location as good dusters and had clusters.

In yet other examples, the method may include employing a machine learning technique to identify clusters of time-frequency vectors with substantially similar "goodness" indicator value. Employing the machine learning technique may include using one or more of a neural network, a support vector machine (SVM), and a Bayesian algorithm. Receiving a request may include receiving a request over a wireless communication technology that utilizes a multiple access technology. The method may also include determining the time-frequency vector for one of a single sub-carrier frequency or a group of sub-carrier frequencies.

In other examples, a controller for a wireless network configured to employ predictive spectral allocation may be described. The controller may include a communication module for communicating with a plurality of mobile devices over a wireless network. The controller may also include a processor coupled to the communication module. The processor may be configured to receive a request for sub-carrier allocation from a mobile device, the request including a timestamp and a location of the mobile device. The processor may also be configured to identify a good cluster based on the timestamp and the location, select a time-frequency vector from the "good" cluster, and transmit sub-carrier allocation information to the mobile device based on the time-frequency vector.

In some examples, the sub-carrier allocation information may include a sequence of frequencies to be used in consecutive time slots. The processor may also be configured to switch to a default sub-carrier allocation in response to receiving an indication from the mobile device that the sub-carrier allocation is unacceptable. The processor may further forward a bad quality indication associated with the sub-carrier allocation to an analysis server.

In further examples, the processor may identify the good cluster based on the timestamp and the location by: receive information on device location, time slots, sub-carrier(s) allotted for each time slot, and quality indicators from a plurality of mobile devices; group the time slots by location to form analysis intervals; identify a time-frequency vector for each analysis interval, where the time-frequency vector associates the analysis interval with the device location; compute a goodness indicator for each time-frequency vector; and identify clusters of time-frequency vectors for each analysis interval and associated location as good clusters and bad clusters.

In yet other examples, the processor may employ a machine learning technique to identify clusters of time-frequency vectors with substantially similar goodness indicator values. The machine learning technique may include one or more of a neural network and a support vector machine (SVM) algorithm. A communication technology employed to communicate with the mobile device is a multiple access technology. The controller may be part of a base station. A type of communication between the controller and the mobile device may be one of data communication or audio communication. The wireless network may be an Evolved Universal Mobile Telecommunications System Terrestrial Radio Access Network (eUTRAN), a long term evolution (LTE) network, an LTE-Advanced network, a high speed packet access (HSPA) network, or an HSPA-Advanced network.

In further examples, a method for analyzing sub-carrier allocation data to categorize clusters for predictive spectral allocation in wireless networks may be described. The method may include receiving information on device location, time slots, sub-carrier(s) allotted for each time slot, and quality indicators from a plurality of mobile devices; grouping the time slots to form analysis intervals; and identifying a time-frequency vector for each analysis interval, where the time-frequency vector associates the analysis interval with the device location. The method may also include computing a goodness indicator for each time-frequency vector; identifying, clusters of time-frequency vectors; and categorizing the clusters of time-frequency vectors into two or more categories.

In some examples, categorizing the clusters into two or more categories may include labeling the clusters as good clusters or bad clusters. The method may also include employing a machine learning technique to identify the clusters of time-frequency vectors with substantially similar "goodness" indicator values. The machine learning technique may include one or more of a neural network and a support vector machine (SVM) algorithm. Computing the goodness indicator may include computing the goodness indicator based on one or more of: a channel quality indicator from the mobile device, a received signal strength indicator (RSSI), a bit error rate (BER), a number of packet retransmissions, a signal to noise ratio (S/N), a number of call failures, a user feedback, a user requested power-down at a same bit-rate, and/or a user requested power-up.

In other examples, the method may include dynamically adjusting a length of the analysis intervals based on one or more of a time of day, a day of week, a day of month, a season, and/or an expected population change within a geographic area. The device location may be based on a plurality of units of geographic grid, and the method further may include dynamically adjusting a size of each unit of geographic grid based on one or more of whether the device location is in a densely populated area, whether the device location is in a sparsely populated area, a communication technology of the wireless network, and/or a selected frequency of communication.

In yet other examples, the method may include further adjusting, the size of each unit of geographic grid based on one or more of a time of day, a day of week, a day of month, a season, and/or an expected population change within a geographic area. Receiving the information from a plurality of mobile devices may include receiving the information over a wireless communication technology that utilizes a multiple access technology. The method may also include determining the time-frequency vector for a single sub-carrier frequency or a group of sub-carrier frequencies. The method may include computing the goodness indicator based on a type of communication associated with a user.

In yet other examples, an analysis server for analyzing sub-carrier allocation data to categorize clusters for predictive spectral allocation in wireless networks may be described. The analysis server may include a memory configured to store instructions and a processor coupled to the memory. The processor may be configured to receive information on device location, time slots, sub-carrier(s) allotted for each time slot, and quality indicators from a plurality of mobile devices; group the time slots by location to form analysis intervals; and identify a time-frequency vector for each analysis interval, where the time-frequency vector associates the analysis interval with the device location. The processor may also be configured to compute a goodness indicator for each time-frequency vector; identify clusters of time-frequency vectors; and categorize clusters of time-frequency vectors into two or more categories.

In some examples, the categories may include good clusters and bad clusters. The processor may also employ a machine learning technique to identify the clusters of time-frequency vectors with substantially similar "goodness" indicator values. The machine learning technique may include one or more of a neural network, a support vector machine (SVM), and a Bayesian algorithm. The processor may compute the goodness indicator based on one or more of: a channel quality indicator from the mobile devices, a received signal strength indicator (RSSI), a bit error rate (BER), a number of packet retransmissions, a signal to noise ratio (S/N), a number of call failures, a user feedback, a user requested power-down at a same bit-rate, and/or a user requested power-up.

In other examples, the processor may dynamically adjust a length of the analysis intervals based on one or more of a time of day, a day of week, a day of month, a season, and/or an expected population change within a geographic area. The processor may further dynamically adjust a size of each unit of geographic grid based on one or more of whether the device location is in a densely populated area, whether the device location is in a sparsely populated area, a communication technology of the wireless network, and/or a selected frequency of communication. The processor may also further adjust the size of each unit of geographic grid based on one or more of a time of day, a day of week, a day of month, a season, and/or an expected population change within a geographic area.

In further examples, the communication technology of the wireless networks may include frequency division multiple access (FDMA), orthogonal frequency division multiple access (OFDMA), or a narrow band allocation technology. The processor may determine the time-frequency vector for one of a single sub-carrier frequency or a group of sub-carrier frequencies and compute the goodness indicator based on a type of communication associated with a user. The analysis server may be part of a base station. The analysis server may receive the information from the plurality of mobile devices via one or more base stations. The wireless networks may include an Evolved Universal Mobile Telecommunications System Terrestrial Radio Access Network (eUTRAN), a long term evolution (LTE) network, an LTE-Advanced network, a high speed packet access (HSPA) network, or an HSPA-Advanced network.

In yet further examples, a computer-readable storage medium may be described with instructions stored thereon for employing predictive spectral allocation in wireless networks, analyzing sub-carrier allocation data to categorize clusters for predictive spectral allocation in wireless networks, and conducting wireless communication employing a sub-carrier allocation from a base station, the instructions causing one or more methods to be performed when executed. The methods may be similar to the methods described above.

There is little distinction left between hardware and software implementations of aspects of systems; the use of hardware or software is generally (but not always, in that in certain contexts the choice between hardware and software may become significant) a design choice representing, cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block, diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be hunted only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the an will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disc, a hard disc drive, a Compact Disc (CD), a Digital Versatile Disc (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined, to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims e.g., bodies of the appended claims) are generally intended as "open" terms e.g., the term "including" should be interpreted as "including, but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the are recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to analyze sub-carrier allocation data to categorize clusters for predictive spectral allocation in a wireless network, the method comprising:
   receiving information on device location, time slots, at least one sub-carrier allotted for each time slot, and quality indicators from a plurality of mobile devices;
   grouping the time slots to form analysis intervals;
   dynamically adjusting a length of the analysis intervals based on an expected population change within a geographic area that encompasses the plurality of mobile devices;
   identifying a time-frequency vector for each analysis interval, wherein the time-frequency vector associates the analysis interval with the device location;
   computing a goodness indicator for each time-frequency vector;
   identifying clusters of time-frequency vectors; and categorizing the clusters of time-frequency vectors into two or more categories.

2. The method according to claim 1, wherein categorizing the clusters into two or more categories comprises labeling the clusters as good clusters or bad clusters.

3. The method according to claim 1, further comprising:
employing a machine learning technique to identify the clusters of time-frequency vectors with substantially similar values of goodness indicators.

4. The method according to claim 1, wherein computing the goodness indicator comprises:
computing the goodness indicator based on one or more of: channel quality indicators from the plurality of the mobile devices, a received signal strength indicator (RSSI), a bit error rate (BER), a number of packet retransmissions, a signal to noise ratio (S/N), a number of call failures, a user feedback, a user requested power-down at a same bit-rate, and a user requested power-up.

5. The method according to claim 1, wherein the device location is based on a plurality of units of a geographic grid, and the method further comprises:
dynamically adjusting a size of each unit of the geographic grid based on one or more of whether the device location is in a densely populated area, whether the device location is in a sparsely populated area, a communication technology of the wireless network, and a selected frequency of communication.

6. The method according to claim 5, further comprising:
further adjusting the size of each unit of geographic grid based on one or more of a time of day, a day of week, a day of month, a season, and an expected population change within a geographic area.

7. The method according to claim 5, wherein receiving the information from the plurality of mobile devices comprises receiving the information over a wireless communication technology that utilizes a multiple-access technology.

8. An analysis server to analyze sub-carrier allocation data to categorize clusters for predictive spectral allocation in a wireless network, the analysis server comprising:
a memory configured to store instructions; and
a processor coupled to the memory, the processor configured to execute a communication application in conjunction with the stored instructions, the communication application comprising:
an analysis module configured to:
evaluate information on device location, time slots, at least one sub-carrier allotted for each of the time slots, and quality indicators received from a plurality of mobile devices;
group the time slots by location to form analysis intervals;
dynamically adjust a length of the analysis intervals based on an expected population change within a geographic area that encompasses the plurality of mobile devices;
identify a time-frequency vector for each analysis interval, wherein the time-frequency vector associates the analysis interval with the device location; and
compute a goodness indicator for each time-frequency vector; and
a support vector machine (SVM) module configured to:
identify clusters of time-frequency vectors; and
categorize clusters of time-frequency vectors into two or more categories.

9. The analysis server according to claim 8, wherein the analysis module is further configured to:
dynamically adjust a size of each unit of a geographic grid based on one or more of whether the device location is in a densely populated area, whether the device location is in a sparsely populated area, a communication technology of the wireless network, and a selected frequency of communication.

10. The analysis server according to claim 9, wherein the analysis module is further configured to:
further adjust the size of each unit of the geographic grid based on one or more of a time of day, a day of week, a day of month, a season, and an expected population change within a geographic area.

11. The analysis server according to claim 8, wherein a communication technology of the wireless network is one of frequency division multiple access (FDMA), orthogonal frequency division multiple access (OFDMA), or a narrow band allocation technology.

12. The analysis server according to claim 8, wherein the analysis module is further configured to:
determine the time-frequency vector for one of a single sub-carrier frequency or a group of sub-carrier frequencies.

13. The analysis server according to claim 8, wherein the analysis module is further configured to:
compute the goodness indicator based on a type of communication associated with a user.

14. The analysis server according to claim 8, wherein the analysis server is part of a base station.

15. The analysis server according to claim 8, wherein the analysis module is configured to receive the information from the plurality of mobile devices via one or more base stations.

16. The analysis server according to claim 8, wherein the wireless network is one of an Evolved Universal Mobile Telecommunications System Terrestrial Radio Access Network (eUTRAN), a long term evolution (LTE) network, an LTE-Advanced network, a high speed packet access (HSPA) network, or an HSPA-Advanced network.

17. A computer readable memory device with instructions stored thereon to analyze sub-carrier allocation data to categorize clusters for predictive spectral allocation in a wireless network, the instructions being executable by a computing device to perform or cause to be performed:
identifying information on device location, time slots, at least one sub-carrier allotted for each time slot, and quality indicators from a plurality of mobile devices;
grouping the time slots to form analysis intervals;
dynamically adjusting a length of the analysis intervals based on an expected population change within a geographic area that encompasses the plurality of mobile devices;
identifying a time-frequency vector for each analysis interval, wherein the time-frequency vector associates the analysis interval with the device location;
computing a goodness indicator for each time-frequency vector;
identifying clusters of time-frequency vectors based on the computed goodness indicator for each time-frequency vector; and
categorizing the clusters of time-frequency vectors into two or more categories.

18. The computer readable memory device of claim 17, wherein the instructions are further executable by the computing device to perform or cause to be performed:

employing a machine learning technique to identify the clusters of time-frequency vectors with substantially similar values of goodness indicators, wherein the machine learning technique includes one or more of a neural network, a support vector machine (SVM), and a Bayes Classifier.

19. The computer readable memory device of claim 17, wherein
dynamically adjusting the length of the analysis intervals is further based on one or more of a time of day, a day of week, a day of month, a season, and a location of a mobile device.

20. The computer readable memory device of claim 17, wherein the instructions are further executable by the computing device to perform or cause to be performed:
determining the time-frequency vector for one of a single sub-carrier frequency or a group of sub-carrier frequencies.

21. The computer readable memory device of claim 17, wherein the instructions are further executable by the computing device to perform or cause to be performed:
computing the goodness indicator based on a type of communication associated with a user.

* * * * *

UNITED STATES PATENT AND TRADEMARK OFFICE
CERTIFICATE OF CORRECTION

PATENT NO. : 9,572,165 B2
APPLICATION NO. : 14/833082
DATED : February 14, 2017
INVENTOR(S) : Keerthi It is certified that error appears in the above-identified patent and that said Letters Patent is hereby corrected as shown below:

On the Title Page

In Item (71), under "Applicant", in Column 1, Lines 2-3, delete "Wilmington (DE)" and insert -- Wilmington, DE (US) --, therefor.

In the Drawings

In Fig. 8, Sheet 10 of 10, for Tag "802", Line 1, delete "SIGNAL-BEARING MEDIUM" and insert -- SIGNAL BEARING MEDIUM --, therefor.

In the Specification

In Column 1, Lines 7-13, delete "35 U.S.C §121 of and claims priority under 35 U.S.C §120 to co-pending U.S. patent application Ser. No. 14/123,199 filed on Nov. 29, 2013, which is a U.S. national stage filing under 35 U.S.C §371 of International Application No. PCT/US13147380 filed on Jun. 24, 2013, which claims priority under 35 U.S.C. §119" and insert -- 35 U.S.C. § 121 of and claims priority under 35 U.S.C. § 120 to U.S. patent application Ser. No. 14/123,199 filed on Nov. 29, 2013, now U.S. Patent No. 9,204,448, which is a U.S. national stage filing under 35 U.S.C. § 371 of International Application No. PCT/US13/47380 filed on Jun. 24, 2013, which claims priority under 35 U.S.C. § 119 --, therefor.

In Column 1, Line 55, delete "performing," and insert -- performing --, therefor.

In Column 2, Line 9, delete "including," and insert -- including --, therefor.

In Column 3, Line 50, delete "herein, it" and insert -- here. It --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,572,165 B2

In Column 4, Line 25, delete "relay device 112" and insert -- relay device --, therefor.

In Column 4, Lines 25-26, delete "employed, to" and insert -- employed to --, therefor.

In Column 4, Line 33, delete "Teleconununications" and insert -- Telecommunications --, therefor.

In Column 4, Line 35, delete "as" and insert -- a --, therefor.

In Column 4, Line 52, delete "enjoying, a" and insert -- enjoying a --, therefor.

In Column 5, Line 50, delete "(BER)" and insert -- (BER), --, therefor.

In Column 7, Line 9, delete "increased," and insert -- increased --, therefor.

In Column 7, Line 13, delete ""bad,"" and insert -- "bad." --, therefor.

In Column 7, Line 24, delete "and" and insert -- and/or --, therefor.

In Column 7, Line 40, delete "ma" and insert -- may --, therefor.

In Column 8, Line 3, delete "(AIX)," and insert -- (ALU), --, therefor.

In Column 9, Line 1, delete "466" and insert -- 466) --, therefor.

In Column 9, Line 46, delete "communications 1." and insert -- communications). --, therefor.

In Column 9, Line 49, delete "LAN." and insert -- LAN, --, therefor.

In Column 9, Line 53, delete "network's" and insert -- networks --, therefor.

In Column 9, Line 62, delete "ill" and insert -- in --, therefor.

In Column 10, Line 8, delete "network's." and insert -- networks. --, therefor.

In Column 10, Line 41, delete "NETWORK." and insert -- NETWORK --, therefor.

In Column 10, Lines 55-56, delete "me-frequency" and insert -- time-frequency --, therefor.

In Column 10, Line 58, delete "block. 628," and insert -- block 628, --, therefor.

In Column 11, Line 13, delete "using, support" and insert -- using support --, therefor.

In Column 11, Line 23, delete "including, a" and insert -- including a --, therefor.

In Column 11, Line 31, delete "THE." and insert -- THE --, therefor.

CERTIFICATE OF CORRECTION (continued)
U.S. Pat. No. 9,572,165 B2

In Column 11, Lines 42-43, delete "Analyzing, sub-carrier" and insert -- Analyzing sub-carrier --, therefor.

In Column 12, Line 3, delete "medium 802" and insert -- signal bearing medium 802 --, therefor.

In Column 12, Line 26, delete "waveguide" and insert -- waveguide, --, therefor.

In Column 12, Line 37, delete "at timestamp" and insert -- a timestamp --, therefor.

In Column 12, Line 50, delete "had quality" and insert -- bad quality --, therefor.

In Column 12, Line 63, delete "dusters and had" and insert -- clusters and bad --, therefor.

In Column 13, Line 28, delete "had quality" and insert -- bad quality --, therefor.

In Column 14, Lines 1-2, delete "identifying, clusters" and insert -- identifying clusters --, therefor.

In Column 14, Line 33, delete "adjusting, the" and insert -- adjusting the --, therefor.

In Column 15, Line 51, delete "representing, cost" and insert -- representing cost --, therefor.

In Column 15, Line 66, delete "block, diagrams," and insert -- block diagrams, --, therefor.

In Column 16, Line 33, delete "hunted" and insert -- limited --, therefor.

In Column 16, Line 41, delete "an" and insert -- art --, therefor.

In Column 17, Line 6, delete "systems control" and insert -- systems; control --, therefor.

In Column 17, Line 21, delete "combined, to" and insert -- combined to --, therefor.

In Column 17, Line 43, delete "e.g.," and insert -- (e.g., --, therefor.

In Column 17, Line 44, delete "e.g.," and insert -- (e.g., --, therefor.

In Column 17, Line 45, delete ""including," and insert -- "including --, therefor.

In Column 18, Line 2, delete "the are" and insert -- the bare --, therefor.

In Column 18, Line 11, delete "together and C together, B and C together," and insert -- together, A and C together, B and C together, --, therefor.

In Column 18, Line 40, delete "Thus for" and insert -- Thus, for --, therefor.